US008433867B2

(12) United States Patent
Eastman et al.

(10) Patent No.: US 8,433,867 B2
(45) Date of Patent: Apr. 30, 2013

(54) USING THE CHANGE-RECORDING FEATURE FOR POINT-IN-TIME-COPY TECHNOLOGY TO PERFORM MORE EFFECTIVE BACKUPS

(75) Inventors: Justin Paul Eastman, Tucson, AZ (US); Jeffrey Richard Suarez, Tucson, AZ (US); Henry Verdugo Valenzuela, Tucson, AZ (US); Andrew Nelson Wilt, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 455 days.

(21) Appl. No.: 12/684,937

(22) Filed: Jan. 9, 2010

(65) Prior Publication Data

US 2011/0173404 A1 Jul. 14, 2011

(51) Int. Cl.
*G06F 12/00* (2006.01)

(52) U.S. Cl.
USPC ............ 711/162; 711/E12.103; 711/E12.002; 707/647; 707/646; 707/999.204; 707/E17.128; 707/E17.061

(58) Field of Classification Search .................. 711/162, 711/170, E12.002, E12.103; 707/645, 646, 707/647, E17.061, E17.128, 999.204
See application file for complete search history.

(56) References Cited

U.S. PATENT DOCUMENTS

| | | | |
|---|---|---|---|
| 6,397,229 B1 | 5/2002 | Menon et al. | |
| 6,611,901 B1 * | 8/2003 | Micka et al. | 711/162 |
| 7,249,130 B2 * | 7/2007 | Vishlitzky et al. | 1/1 |
| 7,266,574 B1 * | 9/2007 | Boudrie et al. | 707/646 |
| 7,346,635 B2 | 3/2008 | Whitten et al. | |
| 7,398,366 B2 | 7/2008 | Ohran et al. | |
| 7,571,293 B1 * | 8/2009 | LeCrone et al. | 711/162 |
| 7,809,691 B1 * | 10/2010 | Karmarkar et al. | 707/674 |
| 8,099,391 B1 * | 1/2012 | Monckton | 707/647 |
| 8,326,803 B1 * | 12/2012 | Stringham | 707/652 |
| 2003/0158831 A1 | 8/2003 | Zaremba | |
| 2006/0235908 A1 | 10/2006 | Armangau et al. | |

(Continued)

OTHER PUBLICATIONS

Wu, Guangjun; Xiaochun Yun; Shupeng Wang, "Design and Implementation of Multi-Version Disk Backup Data Merging Algorithm," Proceedings of the 2008 the Ninth International Conference on Web-Age Information Management, 2008, pp. 526-531, IEEE Computer Society, Washington DC, USA.

(Continued)

*Primary Examiner* — Pierre-Michel Bataille
(74) *Attorney, Agent, or Firm* — Nelson and Nelson; Daniel P. Nelson; Alexis V. Nelson

(57) ABSTRACT

A method for using a change-recording feature to perform more effective backups includes generating an initial point-in-time copy of source data residing in a storage device. The method may then perform an initial backup of the initial point-in-time copy. As changes are made to the source data, the method may record changes made to the source data after the initial point-in-time copy is generated. These changes may be stored as incremental change data. At some point, the initial point-in-time copy may be updated using the incremental change data. In order to perform an incremental backup of the updated point-in-time copy, the method may query the incremental change data to determine which changes were used to update the point-in-time copy. The method may then perform an incremental backup of the updated point-in-time copy by backing up the changes designated in the incremental change data.

23 Claims, 7 Drawing Sheets

U.S. PATENT DOCUMENTS

2008/0162600 A1    7/2008  Mittal et al.
2008/0235266 A1*   9/2008  Huang et al. .................. 707/102
2008/0235299 A1    9/2008  Haselton et al.
2009/0043979 A1    2/2009  Jarvis
2009/0228530 A1    9/2009  Anglin et al.

OTHER PUBLICATIONS

Levy, E.; Silberschatz, A.; "Log-Driven Backups: A Recovery Scheme for Large Memory Database Systems," Information Technology, 1990. 'Next Decade in Information Technology', Proceedings of the 5th Jerusalem Conference on (Cat. No. 90TH0326-9), 1990, pp. 99-109, ISBN: 0-8186-2078-1, Jerusalem, Israel.

Schwendemann, W.; Wang, P., "Algorithm for Determining an Optimal Backup Strategy," IP.com Prior Art Database, IBM TDB, IPCOM000108271D, May 1, 1992.

Qian, Cunhua; Syouji Nakamura; Toshio Nakagawa, "Optimal Backup Policies for a Database System with Incremental Backup," Electronics and Communications in Japan (Part III: Fundamental Electronic Science), Jan. 4, 2002, vol. 85, Issue 4, pp. 1-9.

* cited by examiner

USING THE CHANGE-RECORDING FEATURE FOR POINT-IN-TIME-COPY TECHNOLOGY TO PERFORM MORE EFFECTIVE BACKUPS

BACKGROUND

1. Field of the Invention

This invention relates to backing up data, and more particularly to apparatus and methods for using the change-recording feature of point-in-time-copy technology to perform more effective backups.

2. Background of the Invention

Data is increasingly one of an organization's most valuable assets. Accordingly, it is paramount that an organization regularly back up its data, particularly its business-critical data. Statistics show that a large percentage of organizations are unable to recover from an event of significant data loss, regardless of whether the loss is the result of a virus, data corruption, physical disaster, software or hardware failure, human error, or the like. At the very least, significant data loss can result in lost income, missed business opportunities, and/or substantial legal liability. Accordingly, it is important that an organization implement adequate backup policies and procedures to prevent such losses from occurring.

Currently, various products (i.e., applications) may be used to back up data residing on enterprise storage systems, such as IBM's DS8000 enterprise storage system or other analogous or comparable storage systems. Such backup products may perform a full backup followed by incremental backups that contain data that has changed since the initial full backup or prior incremental backup. The advantage of performing incremental backups as opposed to full backups is that they are generally faster and consume less storage space than multiple full backups.

In order to perform incremental backups, some of the above-mentioned backup products read metadata such as the Volume Table of Contents (hereinafter "VTOC") or the VSAM catalog (hereinafter "catalog") to determine what data has changed since a previous backup. A VTOC, in particular, may include an indicator for each data set indicating whether the data set has been modified since the last backup. Backup products may use this indicator to determine if a data set should be included in an incremental backup.

Unfortunately, the indicators in VTOCs and catalogs are often unreliable since they may be updated even if the associated data sets have not been modified or have been modified in an insignificant way. For example, these indicators may be set if a data set has been opened or referenced in a way that does not change the underlying data. These indicators may also be set if a small or insignificant amount of data in a data set has been changed. This may cause a backup product to back up an entire data set even if the data set has not changed or has changed insignificantly.

In view of the foregoing, what are needed are apparatus and methods to more reliably and effectively back up data sets stored in enterprise storage systems or other storage devices.

SUMMARY

The invention has been developed in response to the present state of the art and, in particular, in response to the problems and needs in the art that have not yet been fully solved by currently available apparatus and methods. Accordingly, the invention has been developed to provide apparatus and methods to reliably and effectively back up data stored in enterprise storage systems or other storage devices. The features and advantages of the invention will become more fully apparent from the following description and appended claims, or may be learned by practice of the invention as set forth hereinafter.

Consistent with the foregoing, a method for using a change-recording feature associated with point-in-time-copy technology to perform more effective and reliable backups is disclosed herein. In certain embodiments, such a method may include generating an initial point-in-time copy of source data residing in a storage device. The method may then perform an initial backup of the initial point-in-time copy. As changes are made to the source data, the method may record changes made to the source data after the initial point-in-time copy is generated. These changes may be stored as incremental change data. At some point in the future, the initial point-in-time copy may be updated using the incremental change data. In order to perform an incremental backup of the updated point-in-time copy, the method may query the incremental change data to determine which changes were used to update the point-in-time copy. The method may then perform an incremental backup of the updated point-in-time copy by backing up the changes designated in the incremental change data.

A corresponding apparatus, computer-program product, and system are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

Figure 1:
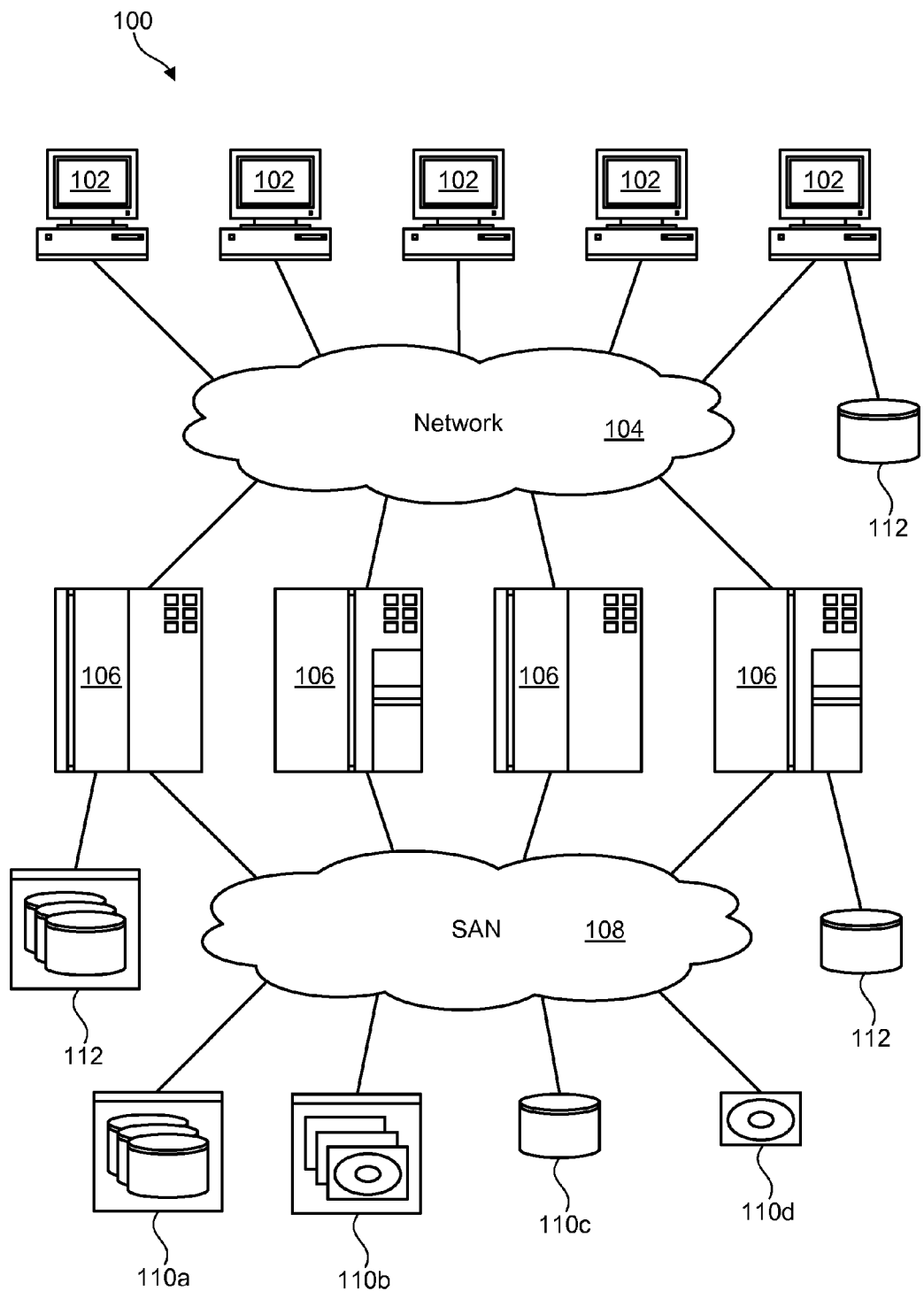
FIG. 1 is a high-level block diagram showing one example of a computer-network environment where an apparatus and method in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, micro-code, etc.) configured to operate hardware, or an embodiment combining software and hardware aspects that may be generally referred to herein as a "module" or "system." Furthermore, the present invention may take the form of a computer program product embodied in any tangible medium of expression having computer-usable program code stored therein.

Any combination of one or more computer-usable or computer-readable medium(s) may be utilized to store the computer program product. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. Computer program code for implementing the invention may also be written in a low-level programming language such as assembly language.

The present invention is described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, one embodiment of computer-network environment 100 is illustrated. The network environment 100 is presented to show one example of a network environment 100 where an apparatus and method in accordance with the invention 100 may be implemented. The network environment 100 is presented only by way of example and is not intended to be limiting. Indeed, the apparatus and methods disclosed herein may be applicable to a wide variety of different computers, servers, storage devices, and network architectures, in addition to the network environment 100 shown.

As shown, the computer-network environment 100 may include one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106. In general, client computers 102 may initiate communication sessions, whereas server computers 106 may wait for requests from the client computers 102. In certain embodiments, the computers 102 and/or servers 106 may connect to one or more internal or external direct-attached storage devices 112 (e.g., hard-disk drives, solid-state drives, tape drives, etc). These computers 102, 106 and direct-attached storage devices 112 may communicate using protocols such as ATA, SATA, SCSI, SAS, Fibre Channel, or the like. Any or all of the computers 102, 106 may utilize the apparatus and methods described herein to more effectively back up data stored in the storage devices 112.

The computer-network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage devices 110, such as arrays 110a of hard-disk drives or solid-state drives, tape libraries 110b, individual hard-disk drives 110c or solid-state drives 110c, individual tape drives 110d, CD-ROM drives or libraries, or the like. Where the network 108 is a SAN, the servers 106 and storage devices 110 may communicate using a networking standard such as Fibre Channel (FC). Any or all of the computers 102, 106 may utilize the apparatus and methods described herein to more effectively back up data stored in the storage devices 110.

Figure 2:
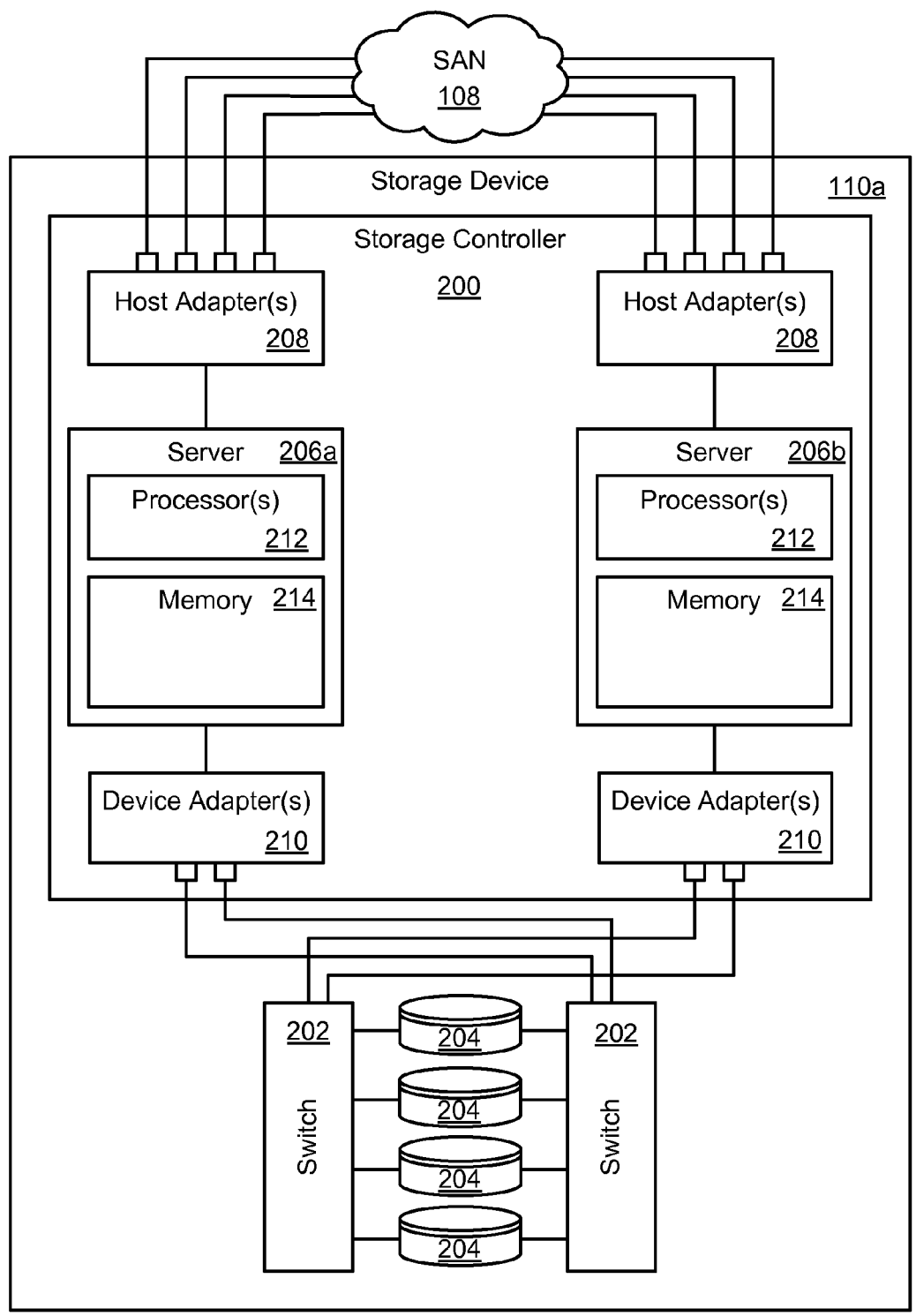
FIG. 2 is a high-level block diagram showing one example of a storage device where an apparatus and method in accordance with the invention may be implemented.

Referring to FIG. 2, one embodiment of a storage device 110a (or storage system 110a) containing an array of hard-disk drives 204 and/or solid-state drives 204 is illustrated. The internal components of the storage device 110a are shown since the apparatus and methods disclosed herein may, in certain embodiments, be implemented within such a storage device 110a, although the apparatus and methods may also be applicable to other storage devices 110. As shown, the storage device 110a includes a storage controller 200, one or more switches 202, and storage devices such as hard disk drives 204 or solid-state drives 204 (such as flash-memory-based drives 204). The storage controller 200 may enable one or more hosts 106 (e.g., open system and/or mainframe servers 106) to access data in the storage devices 204.

In selected embodiments, the storage controller 200 includes one or more servers 206. The storage controller 200 may also include host adapters 208 and device adapters 210 to connect the storage controller 200 to host devices 106 and the storage devices 204 respectively. Multiple servers 206a, 206b may provide redundancy to ensure that data is always available to connected hosts 106. Thus, when one server 206a fails, the other server 206b may remain functional to ensure that I/O is able to continue between the hosts 106 and the storage devices 204. This process may be referred to as a "failover."

One example of a storage system 110a having an architecture similar to that illustrated in FIG. 2 is the IBM DS8000™ enterprise storage system. The DS8000™ is a high-performance, high-capacity storage controller providing disk storage that is designed to support continuous operations. The DS8000™ series models may use IBM's POWER5™ servers 206a, 206b, which may be integrated with IBM's virtualization engine technology. Nevertheless, the apparatus and methods disclosed herein are not limited to the IBM DS8000™ enterprise storage system 110a, but may be implemented in any comparable or analogous storage system 110, regardless of the manufacturer, product name, or components or component names associated with the system 110. Furthermore, any storage system that could benefit from one or more embodiments of the invention is deemed to fall within the scope of the invention. Thus, the IBM DS8000™ is presented only by way of example and is not intended to be limiting.

As shown, each server 206 may include one or more processors 212 (e.g., n-way symmetric multiprocessors) and memory 214. The memory 214 may include volatile memory (e.g., RAM) as well as non-volatile memory (e.g., ROM, EPROM, EEPROM, flash memory, etc.). The volatile memory and non-volatile memory may, in certain embodiments, store software modules that run on the processor(s) 212 and are used to access data in the storage devices 204. The servers 206 may host at least one instance of these software modules. These software modules may manage all read and write requests to logical volumes in the storage devices 204.

Figure 3:
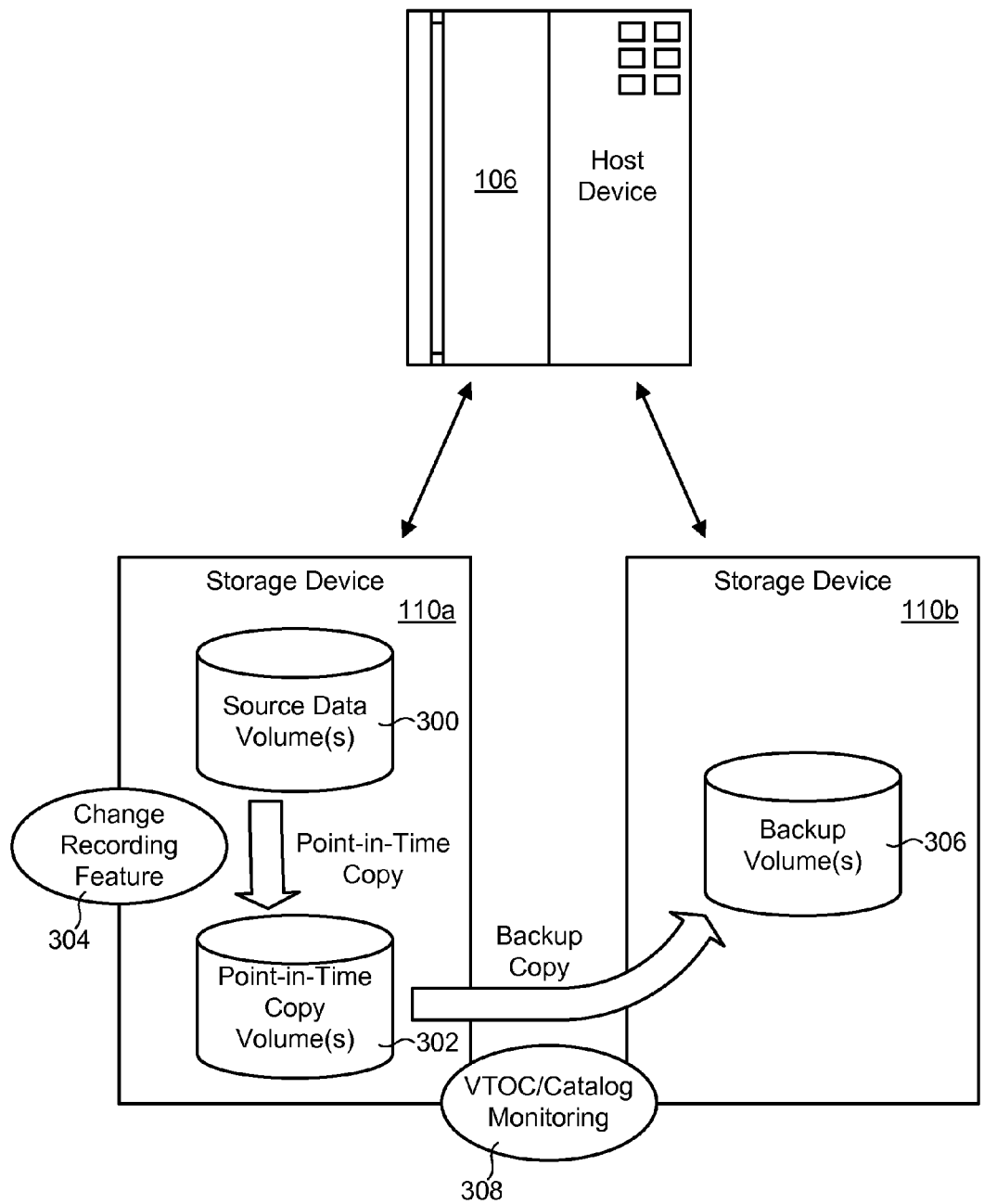
FIG. 3 is a high-level block diagram showing a conventional method for incrementally backing up data stored in a storage device.

Referring to FIG. 3, in selected embodiments, backup applications executing on a host device 106 may be used to back up data residing on storage devices 110 such as IBM's DS8000 enterprise storage system or other analogous or comparable storage systems. In practice, instead of directly backing up data (hereinafter referred to as "source data" 300) in a storage device 110a, a point-in-time copy 302 of the source data may be generated. The backup application may then back up the point-in-time copy 302 instead of the source data 300. This will ensure that applications that are accessing (reading from and/or writing to) the source data 300 will not be negatively impacted (due to degraded I/O speed or lack of access to data, for example) while the backup is in process.

In order to generate the point-in-time copy 302, an application such as IBM's FlashCopy® or Hitachi's ShadowImage® may be utilized. In certain embodiments, this point-in-time-copy application may execute within the storage controller 200 of the storage device 110a. In certain embodiments, the point-in-time-copy application may include a change-recording feature (such as IBM's Incremental Flash-Copy® feature) that enables the storage controller 200 to record any changes that are made to the source data 300 after the initial point-in-time copy 302 is generated. This incremental change data may be used to update the initial point-in-time copy 302 with only the changes instead of making an entirely new point-in-time copy.

In certain embodiments, the change-recording feature 304 records changes on a track-by-track basis. That is, the change-recording feature 304 may record which tracks of the source data 300 have changed since the last point-in-time copy. In certain cases, the change-recording feature 304 may have no knowledge of the actual data sets (i.e., files) that are associated with the tracks. The point-in-time-copy application may update the corresponding tracks in the point-in-time copy 302 when an incremental update is performed.

Once a point-in-time copy 302 is generated, a backup application may back up the point-in-time copy 302 to produce a backup copy 306. In certain cases, the backup copy 306 may be stored in a cost-efficient storage medium such as a tape drive or a direct-access storage device (DASD). This cost-efficient medium may reside in another storage device 110b although this is not mandatory. In certain cases, the backup application may execute on the host device 106. Thus, when performing a backup, the host device 106 may read data sets from the point-in-time copy 302 and write these data sets to the backup copy 306.

In certain embodiments, the backup application may include functionality to incrementally back up data that has changed since a previous full backup or incremental backup. To perform these incremental backups, conventional backup applications may monitor 308 the VTOC or catalog for the point-in-time copy 302 to determine what data sets in the point-in-time copy 302 have changed since the last backup. As previously described, the VTOC may include an indicator for each data set indicating whether the data set has been modified since the last backup. This indicator may be reset when the data set is actually backed up. The conventional backup application may use this indicator to determine if a data set should be included in an incremental backup.

Unfortunately, the VTOC and catalog indicators in are often unreliable since they may be updated even if the associated data sets have not been modified or have been modified in an insignificant manner. For example, these indicators may in certain cases be set if a data set has been opened or has been referenced in some way. These indicators may also be set if a small or insignificant amount of data in a data set has changed. This may cause a conventional backup application to back up an entire data set even if the data set has not changed or only a small portion of the data set has changed.

Figure 4:
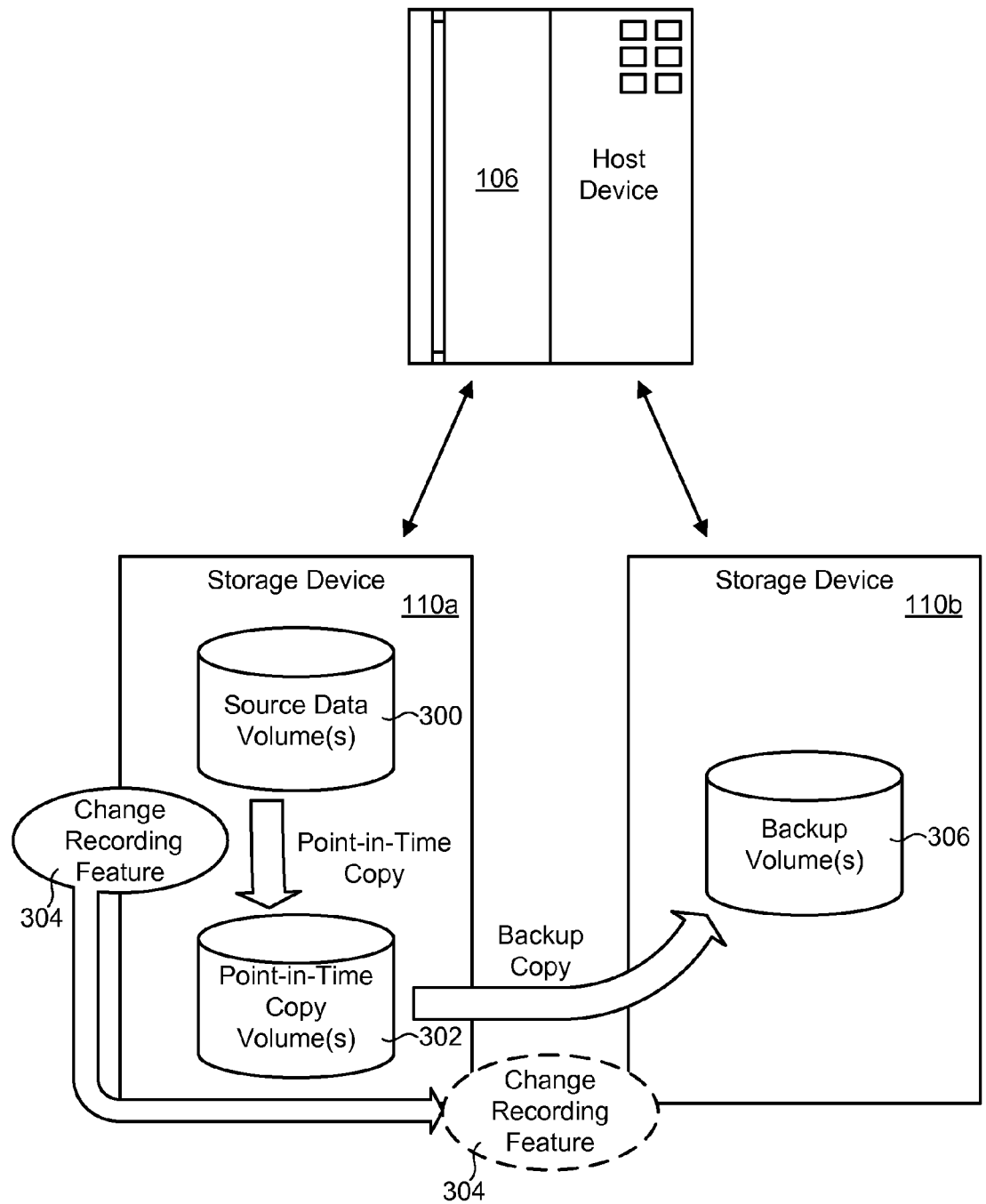
FIG. 4 is a high-level block diagram showing an improved method for incrementally backing up data stored in a storage device.

Referring to FIG. 4, to overcome the problems associated with using the VTOC or catalog to perform incremental backups, in selected embodiments, a backup application may be configured to utilize the change-recording feature 304 inherent in point-in-time-copy applications, such as IBM's Incremental FlashCopy® application. This may improve the reliability of the backup application by allowing it to use more reliable storage controller information to perform backups. This will also optionally allow backups to be performed at a much lower level of granularity. That is, in certain embodiments, the incremental backups may be performed at the granularity of a track as opposed to the granularity of a data set. Using the change-recording feature 304 to perform incremental backups may also improve backup efficiency by reducing duplicate backup copies and shortening backup times.

Figure 5:
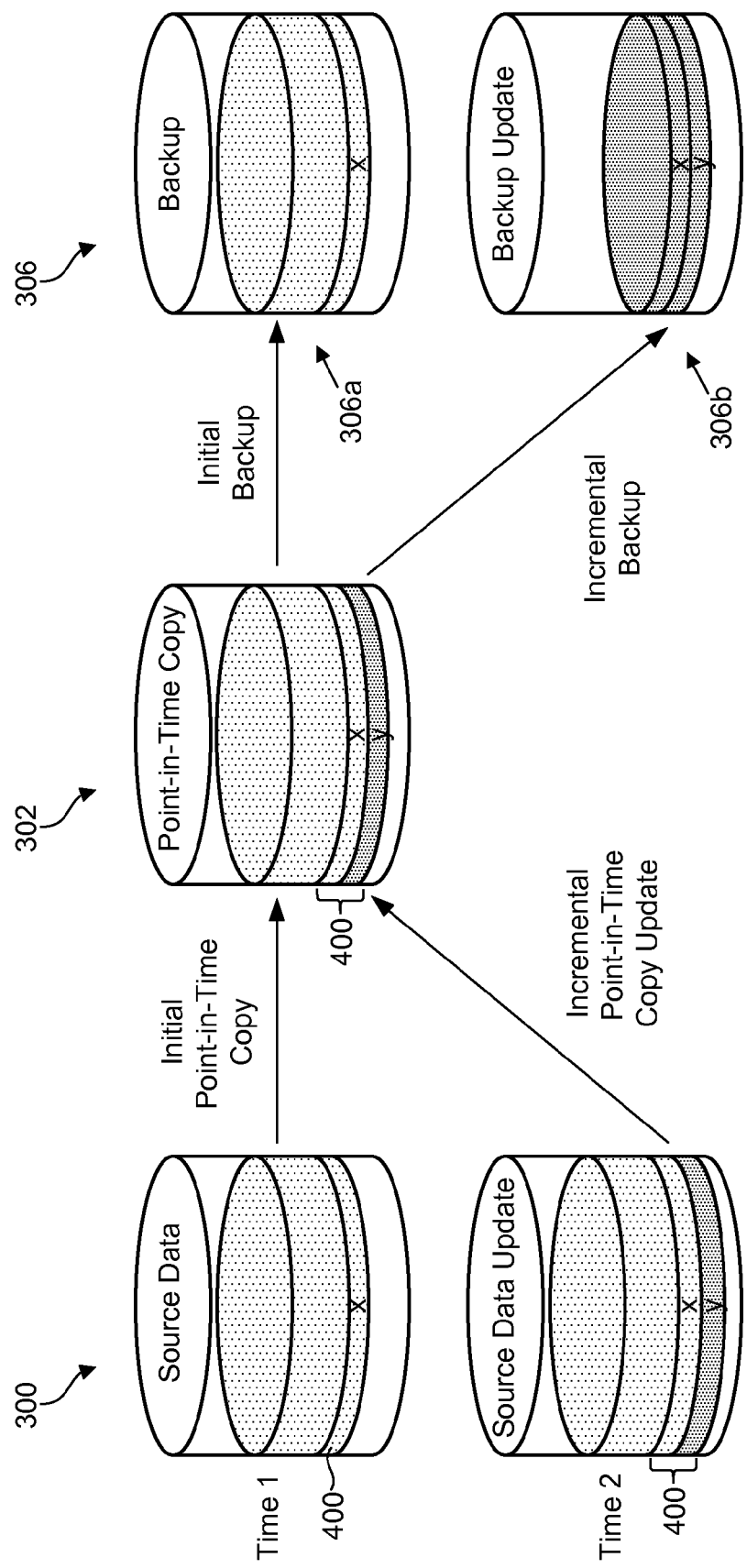
FIG. 5 is a flow chart illustrating the improved method for incrementally backing up data stored in a storage device.

Referring to FIG. 5, a flow chart showing an example of an improved method for performing incremental backups is illustrated. As shown in FIG. 5, at Time 1, an initial point-in-time copy 302 of source data 300 is generated. This source data 300 includes a data set 400 of size x. A backup copy 306 of the initial point-in-time copy 302 is then generated. The lightly shaded regions show the data that is copied from source data 300 to the point-in-time copy 302 at Time 1, and later backed up from the point-in-time copy 302 to the backup copy 306.

Assume that data of size y is added to the data set 400 in the source data 300 at some point after the initial point-in-time copy is generated. This will update one or more tracks in the source data 300. These changes will be recorded by the change-recording feature 304 in the storage controller 200. At Time 2, an incremental update may be performed to update the point-in-time copy 302. This will update the tracks in the point-in-time copy 302 to match the corresponding updated tracks in the source data 300. As shown in FIG. 5, the data set 400 in the updated point-in-time copy 302 includes the new data of size y.

At some future time, the updated point-in-time copy 302 may be incrementally backed up. This may be accomplished by retrieving the incremental change data from the storage controller 200 and determining which tracks in the point-in-time copy 302 have changed since the last backup was performed. The changed tracks may then be mapped to one or more data sets (such as by scanning the VTOC). As an example, the track or tracks containing the data of size y may be associated with the data set 400. The method may then back up the updated data set 400 in its entirety, as shown in FIG. 5. Alternatively, the method may only back up the specific track or tracks that have been updated in the point-in-time copy 302. By using incremental change data associated with the change-recording feature instead of information extracted from the VTOC or catalog, data may be backed up in a more reliable and efficient manner.

In selected embodiments, the backup copies 306a, 306b made at Time 1 and Time 2, respectively, may also be referred to as backup versions. For example, the backup data 306a generated at Time 1 could be considered Version 0 and the backup data 306b generated at Time 2 could be considered Version 1 and so forth. This could be useful for applications that need to recover a specific backup version from a backup inventory.

Figure 6:
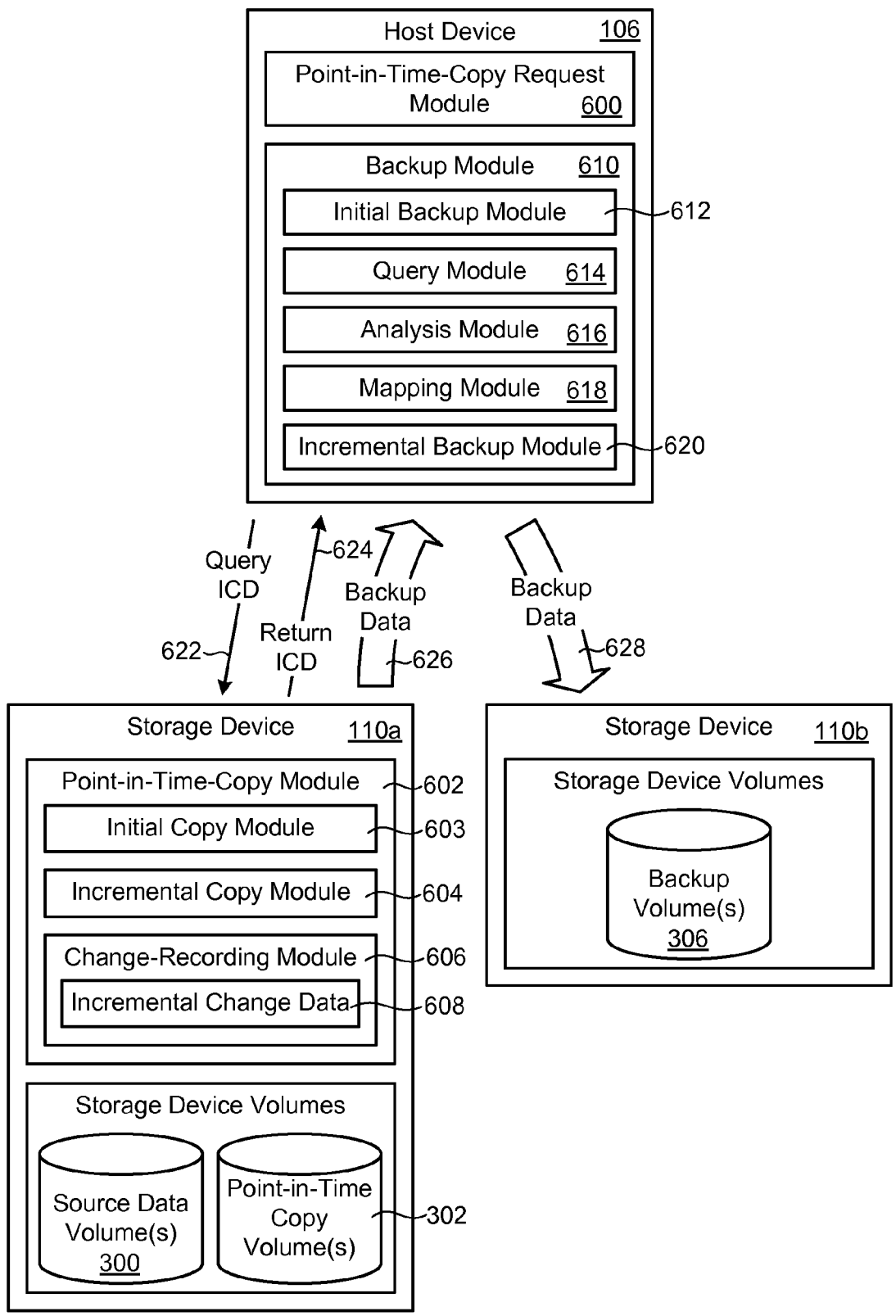
FIG. 6 is a high-level block diagram showing one embodiment of various modules that may be used to implement an apparatus and method in accordance with the invention.

Referring to FIG. 6, the methods and techniques described in FIGS. 4 and 5 may be implemented by one or more modules. These modules may be implemented in hardware, software or firmware executable on hardware, or a combination thereof. These modules are presented only by way of example and are not intended to be limiting. Indeed, alternative embodiments may include more or fewer modules than those illustrated. Furthermore, it should be recognized that the functionality of some modules may be broken into multiple modules or, conversely, the functionality of several modules may be combined into a single module or fewer modules. It should also be recognized that the modules are not necessarily implemented in the locations where they are illustrated. For example, certain functionality shown in a host device 106 may actually be implemented in a storage device 110 and vice versa. Other functionality shown only in the host device 106 or the storage device 110 may actually be distributed across the host device 106 and the storage device 110. Thus, the location of the modules is presented only by way of example and is not intended to be limiting.

As shown in FIG. 6, in a first contemplated embodiment, a host device 106 may include a request module 600 to generate a request to create a point-in-time copy of source data 300 residing in a storage system 110a. This request may be sent, along with any necessary parameters, to the storage system 110a. A point-in-time-copy module 602 in the storage system 110a may receive the request and generate a point-in-time copy of the source data 300. In certain embodiments, this point-in-time-copy module 602 may include an initial copy module 603 and an incremental copy module 604. The initial copy module 603 may make a full point-in-time copy 302 of the source data 300 whereas the incremental copy module 604 may incrementally update the point-in-time copy 302 after the initial copy is generated.

To enable incremental updates of the point-in-time copy 302, a change-recording module 606 may be used to record changes that occur to the source data 300 after the point-in-time copy 302 is generated or previously updated. These changes may be time stamped and stored in the form of incremental change data 608. In certain embodiments, this incremental change data may record changes to the source data 300 on a track-by-track basis. The incremental copy module 604 may use this incremental change data 608 to determine which tracks of the source data 300 have changed in order to update the corresponding tracks in the point-in-time copy 302.

After a point-in-time copy 302 has been generated, a backup module 610 may back up data in the point-in-time copy 302. As illustrated, the backup module 610 is implemented primarily in the host device 106. In certain embodiments, the backup module 610 may include an initial backup module 612 and an incremental backup module 620. The initial backup module 612 may make a full backup of the point-in-time copy 302 whereas the incremental backup module 620 may incrementally back up changes that are made to the point-in-time copy 302.

To perform incremental backups of the point-in-time copy 302, a query module 614 may query 622 the storage device 110a to retrieve the incremental change data (ICD) 608. The storage device 110a may then return 624 the incremental change data. An analysis module 616 may then analyze the incremental change data 608 to determine which tracks in the point-in-time copy 302 have changed since the last backup was performed. In certain embodiments, a mapping module 618 may map the changed tracks to the data sets that are associated with the tracks. The incremental backup module 620 may then perform an incremental backup by backing up the data sets that are associated with the changed tracks. In certain embodiments, this may be accomplished by reading 626 the changed data sets from the point-in-time copy 302 and writing 628 these same data sets to the backup copy 306. Alternatively, the incremental backup module 620 may simply back up tracks (instead of data sets) that have changed by reading 626 the changed tracks from the point-in-time copy 302 and writing 628 these tracks to the backup copy 306.

Figure 7:
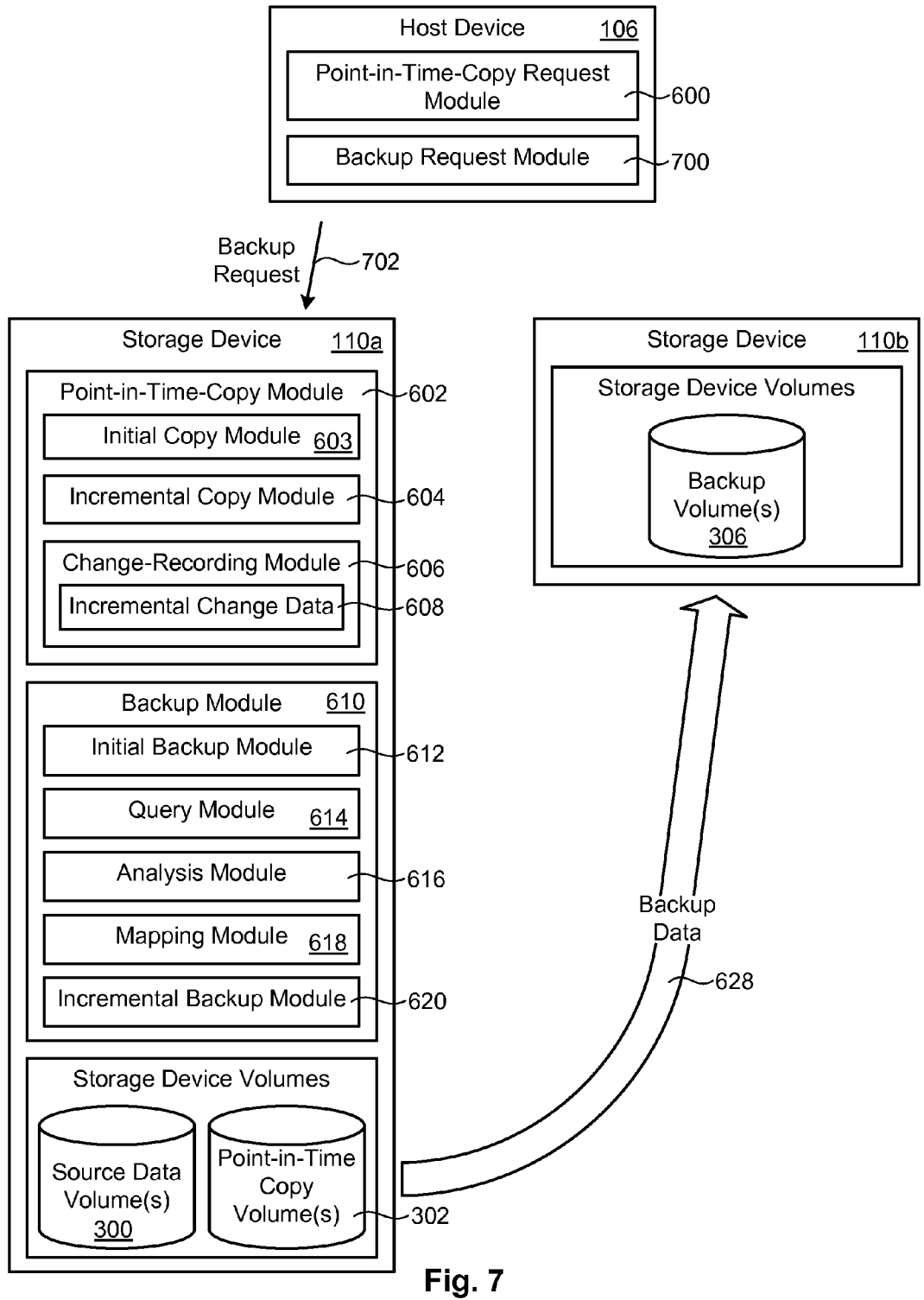
FIG. 7 is a high-level block diagram showing another embodiment of various modules that may be used to implement an apparatus and method in accordance with the invention.

Referring to FIG. 7, an alternative to the embodiment illustrated in FIG. 6 is illustrated. In this embodiment, the backup module 610 is located primarily in the storage device 110a as opposed to the host device 106. Like the previous example, a request module 600 in the host device 106 may generate a request to create a point-in-time copy of source data 300 residing in the storage system 110a. A point-in-time-copy module 602 in the storage system 100a may receive this request and generate a point-in-time copy of the source data 300. The point-in-time-copy module 602 may include an initial copy module 603, to make a full point-in-time copy 302, and an incremental copy module 604 to incrementally update the point-in-time copy 302 after the initial copy is generated. A change-recording module 606 may record changes that occur to the source data 300 after a point-in-time copy 302 has been generated or updated.

At some point in time, a backup request module 700 in the host device 106 may transmit 702 a request to the backup module 610 to perform a backup, such as a full or incremental backup. The backup module 610, implemented in the storage device 110*a*, may then back up the data in the point-in-time copy 302. This backup module 610 may include an initial backup module 612, to make a full backup of the point-in-time copy 302, and an incremental backup module 620, to incrementally back up changes made to the point-in-time copy 302 since the last backup. When incrementally backing up changes to the point-in-time copy 302, a query module 614 may query the incremental change data 608. An analysis module 616 may then analyze the incremental change data (such as by looking at the time stamps) to determine which tracks in the point-in-time copy 302 have changed since the last backup was performed. If desired, a mapping module 618 may map the changed tracks to one or more data sets that are associated with the tracks. The incremental backup module 620 may then incrementally back up the data sets that contain the changed tracks. This may be accomplished, for example, by directly writing 628 the changed data sets to the backup volume 306 or volumes 306. Alternatively, the incremental backup module 620 could simply write 628 the changed tracks to the backup volumes 306 instead of the entire data sets.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/ or flowchart illustrations, may be implemented by special purpose hardware-based systems that perform the specified functions or acts, or combinations of special purpose hardware and computer instructions.

The invention claimed is:

1. An apparatus to use the change-recording feature associated with point-in-time-copy technology to perform more effective backups, the apparatus comprising:
    at least one processor;
    at least one memory device operably coupled to the at least one processor and storing instructions for execution on the at least one processor, wherein the instructions are configured to:
        generate, by a point-in-time-copy application, an initial point-in-time copy of source data residing in a storage device;
        perform, by a backup application, an initial backup of the initial point-in-time copy;
        record, by the point-in-time-copy application using a change-recording feature of the point-in-time-copy application, incremental change data documenting changes made to the source data after the initial point-in-time copy is generated;
        update, by the point-in-time-copy application, the initial point-in-time copy in accordance with the incremental change data to generate an updated point-in-time copy;
        query, by the backup application, the incremental change data to determine which changes were made to the initial point-in-time copy to generate the updated point-in-time copy; and
        perform, by the backup application, an incremental backup of the updated point-in-time copy by backing up the changes designated in the incremental change data.

2. The apparatus of claim 1, wherein the point-in-time-copy application records changes made to the source data on a track-by-track basis.

3. The apparatus of claim 1, wherein the backup application backs up specific tracks indicated in the incremental change data.

4. The apparatus of claim 1, wherein the backup application maps tracks in the incremental change data to specific data sets and backs up the specific data sets.

5. The apparatus of claim 1, wherein the point-in-time-copy application is implemented in a storage controller of the storage device storing the source data.

6. The apparatus of claim 5, wherein the backup application is configured to query the storage controller to retrieve the incremental change data.

7. The apparatus of claim 6, wherein the backup application is implemented in a host device configured to query the storage controller.

8. A system to use the change-recording feature associated with point-in-time-copy technology to perform more effective backups, the system comprising:
    a storage controller comprising a point-in-time-copy application to generate an initial point-in-time copy of source data residing in a storage device;
    a host device comprising a backup application configured to perform an initial backup of the initial point-in-time copy;
    the storage controller configured to record, using a change-recording feature of the point-in-time-copy application, incremental change data documenting changes made to the source data after the initial point-in-time copy is generated;
    the storage controller configured to update, using the point-in-time-copy application, the initial point-in-time copy in accordance with the incremental change data to generate an updated point-in-time copy;
    the host device further configured to query, using the backup application, the incremental change data in the storage controller to determine which changes were made to the initial point-in-time copy to generate the updated point-in-time copy; and
    the host device further configured to perform, using the backup application, an incremental backup of the updated point-in-time copy by backing up the changes designated in the incremental change data.

9. The system of claim 8, wherein the storage controller is configured to record changes made to the source data on a track-by-track basis.

10. The system of claim 8, wherein the host device is configured to back up specific tracks indicated in the incremental change data.

11. The system of claim 8, wherein the host device is configured to map tracks in the incremental change data to specific data sets and back up the specific data sets.

12. A method to use the change-recording feature associated with point-in-time-copy technology to perform more effective backups, the method comprising:

generating, by a point-in-time-copy application, an initial point-in-time copy of source data residing in a storage device;

performing, by a backup application, an initial backup of the initial point-in-time copy;

recording, by the point-in-time-copy application using a change-recording feature of the point-in-time-copy application, incremental change data documenting changes made to the source data after the initial point-in-time copy is generated;

updating, by the point-in-time-copy application, the initial point-in-time copy in accordance with the incremental change data to generate an updated point-in-time copy;

querying, by the backup application, the incremental change data to determine which changes were made to the initial point-in-time copy to generate the updated point-in-time copy; and performing, by the backup application, an incremental backup of the updated point-in-time copy by backing up the changes designated in the incremental change data.

13. The method of claim 12, wherein recording changes made to the source data comprises recording changes to the source data on a track-by-track basis.

14. The method of claim 12, wherein performing an incremental backup comprises backing up specific tracks indicated in the incremental change data.

15. The method of claim 12, wherein performing an incremental backup comprises mapping tracks in the incremental change data to specific data sets, and backing up the specific data sets.

16. The method of claim 12, where the source data and the initial point-in-time copy reside on the same storage device, and the initial backup resides on a different storage device.

17. The method of claim 12, further comprising configuring a storage controller on the storage device to record the changes made to the source data after the initial point-in-time copy is generated.

18. The method of claim 17, wherein querying the incremental change data comprises querying the storage controller to retrieve the incremental change data.

19. The method of claim 18, further comprising configuring a host device to query the storage controller in order to retrieve the incremental change data.

20. A computer program product to use the change-recording feature associated with point-in-time-copy technology to perform more effective backups, the computer program product comprising a computer-readable storage medium having computer-usable program code stored therein, the computer-usable program code comprising:

computer-usable program code to generate, by a point-in-time-copy application, an initial point-in-time copy of source data residing in a storage device;

computer-usable program code to perform, by a backup application, an initial backup of the initial point-in-time copy;

computer-usable program code to record, by the point-in-time-copy application using change-recording feature of the point-in-time-copy application, incremental change data documenting changes made to the source data after the initial point-in-time copy is generated;

computer-usable program code to update, by the point-in-time-copy application, the initial point-in-time copy in accordance with the incremental change data to generate an updated point-in-time copy;

computer-usable program code to query, by the backup application, the incremental change data to determine which changes were made to the initial point-in-time copy to generate the updated point-in-time copy; and computer-usable program code to perform, by the backup application, an incremental backup of the updated point-in-time copy by backing up the changes designated in the incremental change data.

21. The computer program product of claim 20, wherein recording changes made to the source data comprises recording changes made to the source data on a track-by-track basis.

22. The computer program product of claim 20, wherein performing an incremental backup comprises backing up specific tracks indicated in the incremental change data.

23. The computer program product of claim 20, wherein performing an incremental backup comprises mapping tracks in the incremental change data to specific data sets and backing up the specific data sets.

* * * * *